US007059955B2

(12) United States Patent
Green et al.

(10) Patent No.: US 7,059,955 B2
(45) Date of Patent: Jun. 13, 2006

(54) PORTABLE ANIMAL HOISTS

(75) Inventors: James Wilbur Green, Jasper, GA (US); Sherry Jean Green, Jasper, GA (US)

(73) Assignee: Trophyline, LLC, Jasper, GA (US)

( * ) Notice: Subject to any disclaimer, the term of this patent is extended or adjusted under 35 U.S.C. 154(b) by 65 days.

(21) Appl. No.: 10/424,029

(22) Filed: Apr. 25, 2003

(65) Prior Publication Data

US 2004/0026675 A1 Feb. 12, 2004

Related U.S. Application Data

(60) Provisional application No. 60/375,498, filed on Apr. 25, 2002.

(51) Int. Cl.
*A22B 1/00* (2006.01)

(52) U.S. Cl. .................................................... 452/189

(58) Field of Classification Search ................ 254/334, 254/335; 414/543, 462; 452/185, 187–192
See application file for complete search history.

(56) References Cited

U.S. PATENT DOCUMENTS

| | | | | |
|---|---|---|---|---|
| 565,685 | A * | 8/1896 | Millikin | 212/175 |
| 2,496,401 | A * | 2/1950 | McKinney | 414/543 |
| 4,560,074 | A * | 12/1985 | Manning | 212/179 |
| 4,806,063 | A | 2/1989 | York | |
| 5,211,601 | A * | 5/1993 | Cope | 452/187 |
| 5,395,284 | A | 3/1995 | Frisk | |
| 5,562,534 | A | 10/1996 | McGough | |
| 5,662,451 | A | 9/1997 | Muzzi et al. | |
| 5,788,095 | A * | 8/1998 | Watson | 212/180 |
| 5,820,455 | A | 10/1998 | Breedlove | |
| 5,971,177 | A | 10/1999 | Carter | |
| 5,975,831 | A | 11/1999 | Martin | |
| 6,086,312 | A * | 7/2000 | Ziaylek et al. | 414/462 |
| 6,089,431 | A * | 7/2000 | Heyworth | 224/521 |
| 6,109,855 | A | 8/2000 | Vela-Cuellar | |
| 6,138,991 | A | 10/2000 | Myers, Jr. | |
| 6,155,771 | A | 12/2000 | Montz | |
| 6,250,483 | B1 * | 6/2001 | Frommer | 212/180 |

* cited by examiner

*Primary Examiner*—Thomas Price
(74) *Attorney, Agent, or Firm*—Akerman Senterfitt; Michael K. Dixon

(57) ABSTRACT

A portable hoist for suspending a load, which may be an animal. The portable animal hoist may include a telescopic arm rotatable about a base. The base may be configured to be releasably attachable to many devices, one of which may be a receiver hitch on a vehicle. A winch may be attached to the telescopic arm for supporting a load. The telescopic arm may also include one or more pulleys for supporting a cable coupled to the winch. The portable hoist may be used to transport animals while being suspended by the hoist.

30 Claims, 7 Drawing Sheets

FIGURE 7
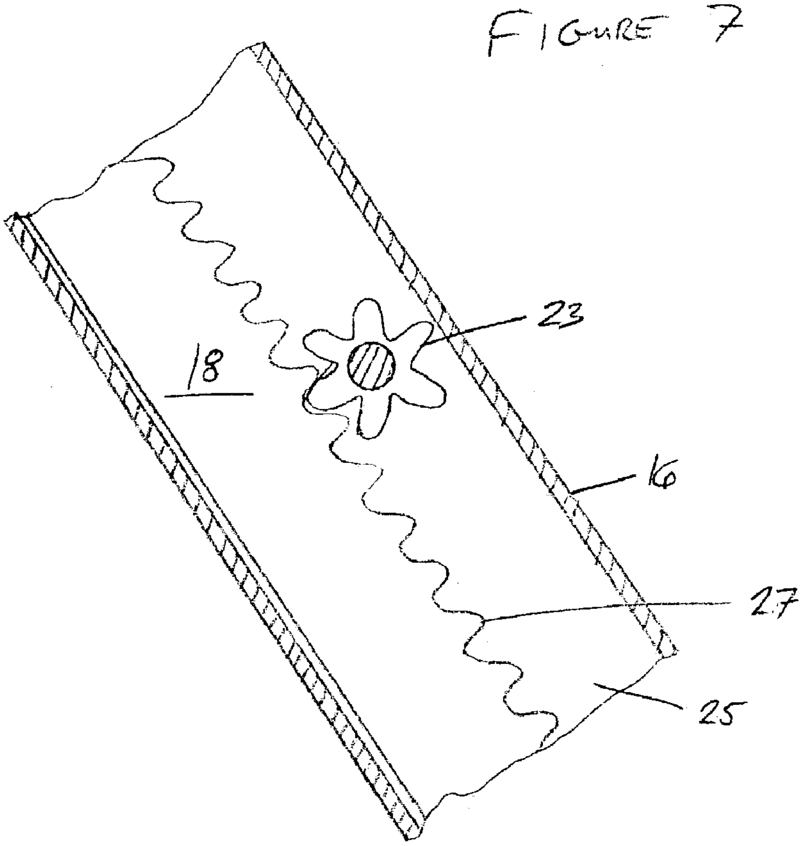
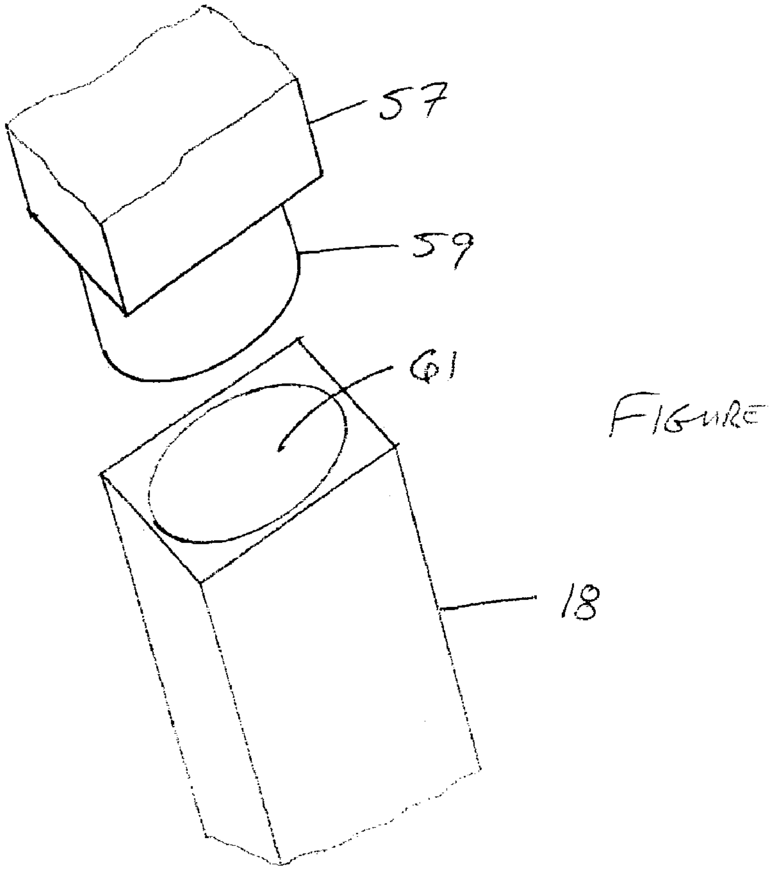
FIGURE 8

PORTABLE ANIMAL HOISTS

CROSS-REFERENCE TO RELATED APPLICATION

This application claims the benefit of U.S. Provisional Application No. 60/375,498, filed Apr. 25, 2002.

FIELD OF THE INVENTION

The invention is directed generally to animal hoists, and more particularly, to hoists capable of lifting and supporting harvested big-game animals for field dressing, cleaning and transportation from the field.

BACKGROUND

Big-game hunting is a popular recreational activity pursued by hunters in many parts of the United States, Canada and else where in the world. Big-game animals typically include animals such as, but not limited to, elk, whitetail deer, blacktail deer, mule deer, wild hog, javelina, black bear, and brown bear. While hunting big-game animals is itself challenging, properly handling harvested animals can be equally as challenging. A hunter must use care from the moment an animal is harvested to insure that the meat of the animal remains clean until it is either eaten or prepared for storage and to reduce the temperature of the meat as soon as possible. If a harvested animal is a trophy animal, additional care must be taken to ensure that the animal's cape, head, and antlers or horns, if any, remain in good condition for mounting.

Once an animal is harvested, the harvested animal must be field dressed, skinned and butchered to prepare the meat of the harvested animal for eating. Field dressing is defined as eviscerating a harvested animal. These steps often occur in different physical locations. Often times, hunters choose to field dress harvested animals in the location were the animal fell. Field dressing is often performed at this location because it reduces the weight of the animal, thereby making the animal easier to drag, reduces the amount of by products from a harvested animal that must be disposed by the hunter, and allows harmful body heat to escape from the carcass of the harvested animal. It is generally understood that the meat of a harvested animal begins to decompose shortly after death, and body heat of an animal can lead to spoilage of the meat. While field dressing helps reduce the internal body temperature of a harvested animal, field dressing a harvested animal in the field often introduces dirt and detritus into the internal body cavity of harvested animals because hunters often field dress harvested animals while the harvested animals are lying on the ground. Because of the possibility of introducing these contaminants to a harvested animals, some hunters often forgo field dressing a harvested animal in the field. Instead, hunters often chose to complete the process at a hunting camp or other location where the animal can be suspended off of the ground.

Whether a harvested animal is field dressed in the field or not, it is typically taken from the field to a hunting camp or commercial animal processor by first dragging the harvested animal from the location where it was harvested to the closest road. The animal is then loaded into a vehicle. Loading a harvested animal into a vehicle can be difficult at times for a group of-physically able hunters and can be very challenging, if not impossible, for a hunter that has harvested an animal while hunting alone and has no additional assistance. Furthermore, this task is often impossible for physically disabled hunters.

Generally, it is preferable to use the bed of a pick-up truck to transport harvested animals because of the presence of ticks and bodily fluids, such as blood, urine, and other intestinal fluids, on the harvested animals. While a pick-up truck is ideal for transporting harvested animals, some hunters do not own pick-up trucks. Thus, hunters often use other types of automobiles. If another type of vehicle is used, such as a sports utility vehicle, van or other vehicle, tarps and other protection are required to capture blood escaping from the harvested animal and prevent the blood from escaping onto carpet located in the vehicle. However, tarps typically do not provide adequate protection because tarps leak or are often ineffectively positioned in the vehicle and allow blood and other bodily fluids to leak onto the carpet in the vehicle. In addition, tarps can not prevent the pungent smells that often emanate from animals, such as wild hogs, rutting whitetail bucks and gut-shot animals, from spreading throughout the vehicle. Thus, tarps do not provide adequate protection for interior portions of a vehicle.

Typically, a hunter retrieves a harvested animal from the field with assistance and returns to a hunting camp to clean the harvested animal. Many hunting camps have a skinning rack or other structure that is used to suspend the harvested animal off of the ground. This is accomplished in numerous ways, but one popular method is to suspend the harvested animal off of the ground using a gambrel. Conventional gambrels have a generally triangular shape and are capable of being supported on one of the corners of the triangle with a cable or rope. The remaining two corners typically have hooks for supporting the hind legs of a harvested animal. Gambrels typically are constructed with steel rods forming the triangular shape. The interior portions of the gambrel are usually vacant of material.

While some hunters enjoy the luxury of hunting on land that they own, many hunters hunt on land leased from timber companies and other entities or on publicly held property. Hunters hunting on these lands are reluctant, and often times prohibited, from building permanent skinning racks for hanging and dressing harvested animals. In addition, hunters on these lands often do not have running water to clean harvested animals. Thus, these hunters are often unable to properly clean harvested animals.

SUMMARY OF THE INVENTION

Set forth below is a brief summary of systems and methods according to the invention that address the foregoing problems and provide benefits and advantages in accordance with the purposes of the present invention as embodied and broadly described herein. According to one aspect, certain embodiments of the invention are directed to an animal hoist for holding and supporting a harvested animal, such as a big-game animal, taken by a hunter. The animal hoist includes a main body coupled to a base for support. The base is sized to be received within a conventional receiver hitch most often coupled to a vehicle, such as an automobile or all terrain vehicle (ATV). In another embodiment, the base is capable of being received by a base support system that is not attached to a vehicle. Rather, the base support system is free standing, portable and capable of supporting the animal hoist and an animal being raised by the animal hoist.

The animal hoist also includes a gambrel having at least two hooks for receiving the legs of a harvested animal. The gambrel may also include a retention hook for coupling the gambrel to the main body whenever the animal hoist is not supporting a harvested animal. The retention hook is received within a slot in the main body, and in another embodiment, is received by a ring coupled to the main body. The animal hoist also includes a winch for raising and lowering the gambrel. The gambrel is attached to the winch with a cable made of steel, rope or other material. The cable is supported by at least one pulley to allow for smooth operation of the animal hoist. One embodiment includes two pulleys for supporting the animal hoist.

The main body may be composed of one or more pieces. In certain embodiments, the length of the main body is adjustable, thereby allowing the height of the main body to be adjusted. In one embodiment, the main body is composed of two members capable of forming a telescopic tube. The height of the main body is adjusted by removing a pin from one aperture in the tube, pushing or pulling a tube located inside a larger tube, and reinserting the pin into another aperture in the tube.

The angular relationship between the base and the main body is adjustable to make cleaning procedures easier to accomplish. Specifically, the main body may be positioned relatively perpendicular to the base and substantially vertical while transporting the animal hoist with or without harvested animals. The main body may be rotated around the base in the direction shown in FIG. 1, to place a harvested animal in a better position for field dressing, skinning and butchering. The angular position of the main body may be adjusted by removing a pin coupled to the base and main body, rotating the main body, and replacing the pin to secure the main body to the base.

An advantage of this invention is that the animal hoist is portable, thus allowing the animal hoist to be easily moved between various hunting camps during the season and moved to a storage facility during the off season.

Another advantage of this invention is that the animal hoist may be taken into the field to retrieve a harvested animal without requiring use of interior portions of a vehicle. Thus, interior portions of the transportation vehicle are spared from receiving ticks, bodily fluids and unpleasant odors that often emanate from a harvested animal.

Yet another advantage of this invention is that the animal hoist may be taken into the field to raise a harvested animal off of the ground. This enables a hunter, if desired, to field dress the harvested animal in the woods while the harvested animal is suspended off of the ground. Field dressing an animal that is suspended off of the ground is much easier and cleaner than completing the task while the animal is resting on the ground. By suspending the animal, dirt and detritus can be prevented from contacting the meat and internal cavity of the harvested animal.

Still another advantage of this invention is that the animal hoist can transport a harvested animal to a creek or lake for cleaning when running water is unavailable at a hunting camp or in the vicinity where the animal was harvested.

Another advantage of the animal hoist is that it is capable of being releasably mounted to a base station that may or may not be portable. This advantage is realized where hunters are hunting on leased land and are prohibited from building any permanent structures. In such situations, which are common, the animal hoist can be attached to a base station at a temporary camp and used by all members of the hunting camp. If for some reason the lease is not renewed for the following year by the landowner, the animal hoist can be easily disconnected from the base station and removed from the leased property.

Yet another advantage of this invention is that the animal hoist protects harvested animals during transportation. This feature is extremely advantageous when transporting a trophy animal from the field because once a trophy animal has been harvested, the cape, head, and antlers or horns, if any, must be protected so that a taxidermist receives the animal in good shape.

Another advantage of this invention is that the winch used to raise a load, which may, be a game animal, fish , or other item, may be positioned on the animal hoist so that the winch faces the load being raised. Positioning the winch in this manner allows the animal hoist to be mounted close to the vehicle without threat of the winch hitting and damaging a vehicle to which the animal hoist may be attached.

Still another advantage of this invention is the swivel head at the end of a first telescopic member forming the main body that enables a pulley located at the end of the first telescopic member to rotate a limited distance. This movement enables a load, such as an animal, supported by the animal hoist to be rotated relative to the animal hoist. For instance, the swivel head may aide in moving an animal from a hanging position to the back of a truck to which the animal hoist is coupled.

These and other features and advantages of the present invention will become apparent after review of the following drawings and detailed description of the disclosed embodiments.

BRIEF DESCRIPTION OF THE DRAWINGS

The accompanying drawings, which are incorporated in and form a part of the specification, illustrate preferred embodiments of the presently disclosed invention(s) and, together with the description, disclose the principles of the invention(s). These several illustrative figures include the following:

FIG. 7 is a detailed view cross-sectional view of a first drive gear for moving a second telescopic member relative to a first telescopic member taken at 7—7 in FIG. 3;

FIG. 8 is a detailed perspective view of a swivel head taken at 8—8 in FIG. 3.

DETAILED DESCRIPTION

FIGS. 1–8 illustrate a portable animal hoist 10 for lifting and transporting harvested animals, such as big-game animals, which may include, but are not limited to, elk, whitetail deer, blacktail deer, mule deer, wild hog, javelina, black bear, and brown bear; fish, such as, but not limited to, tuna, shark, and billfish, such as marlin; and other animals. In at least one embodiment, the portable animal hoist 10 may be adapted to be coupled to a vehicle, such as, but not limited to, a truck; a boat; or other object, using a conventional receiver hitch. In at least one embodiment, animal hoist 10 may be capable of lifting and supporting about 800 lbs. However, animal hoist 10 can be appropriately sized to support a load greater than 800 pounds.

Figure 1:
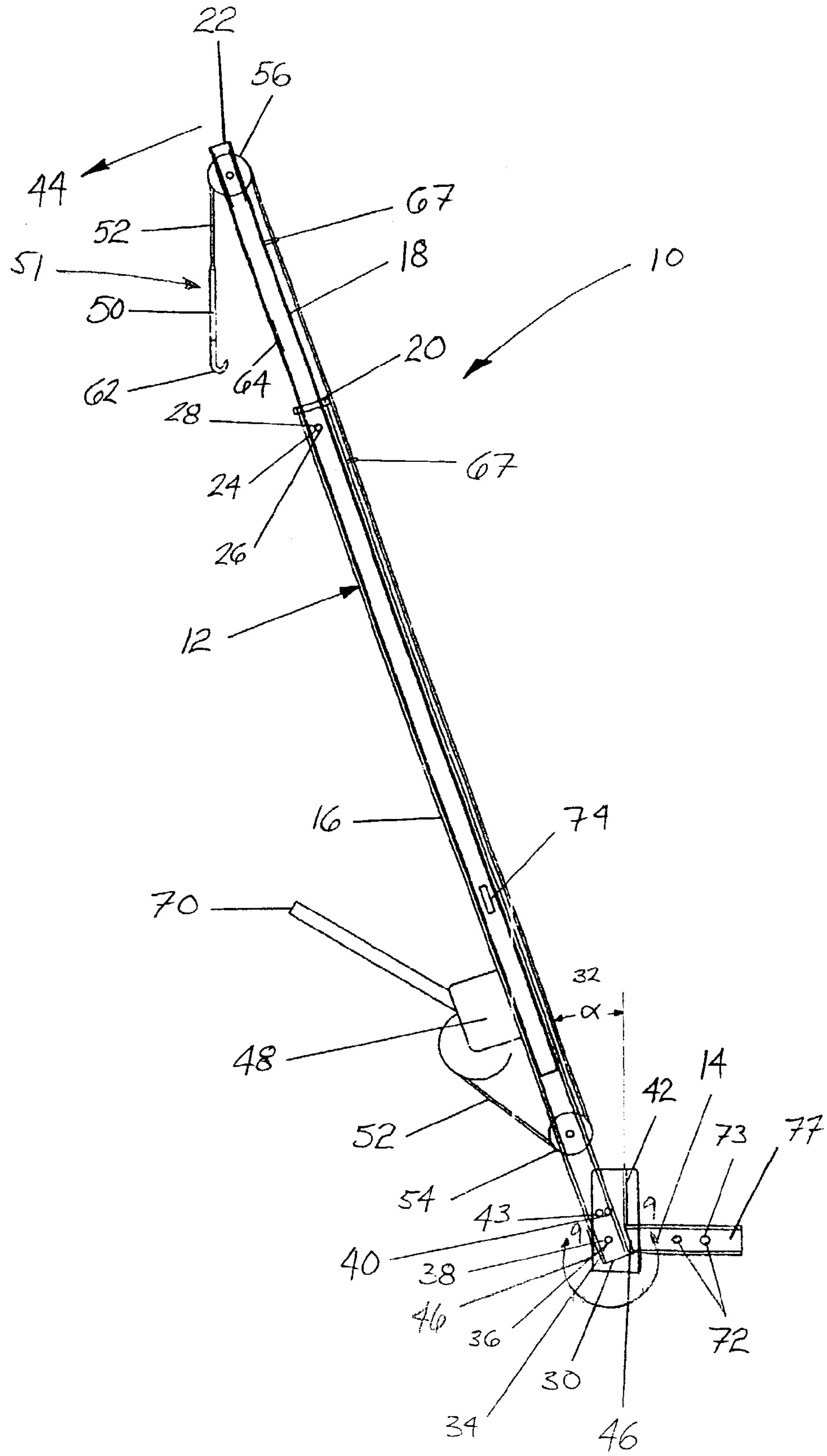
FIG. 1 is a right side view of an animal hoist including aspects of this invention.

As shown in FIG. 1, animal hoist 10 may include a main body 12 coupled to a base 14, which is sized to be received in a standard receiver hitch typically mounted near either a front or rear bumper of a vehicle. Base 14 may also be mounted to a base station capable of supporting animal hoist 10. Thus, animal hoist 10 may be used at a hunting camp, or other location, as a free standing animal hoist that does not require a vehicle for support. In other applications, animal hoist 10 may be used on a boat for loading or unloading fish or may be used at a fish processing facility.

Main body 12 may be composed of one or more pieces and may be one length or have the capability of changing lengths. In one embodiment, main body 12 may include a first telescopic member 16 and a second telescopic member 18. First telescopic member 16 may be sized to receive second telescopic member 18 at end 20 so that second telescopic member 18 may be used to change the height of an end 22 of the second telescopic member 18. In at least one embodiment, the second telescopic member 18 may alter the distance between end 30 of first telescopic member 16 and end 22 of second telescopic member 18 between distances of about 6 feet and about 10 feet. In other embodiments, second telescopic member 18 may be extended between distances less than 6 feet and greater than 10 feet. First telescopic member 16 and second telescopic member 18 may be preferably formed from hollow tubes made of steel, aluminum or other materials of similar strength. The tubes may have a rectangular, square, circular, or other shaped cross-section. In one embodiment, first telescopic member 16 and second telescopic member 18 are comprised of hollow, square channel or steel tubing. In one embodiment, first telescopic member 16 may be formed from 1½ inch square channel steel tubing, and second telescopic member 18 may be formed from 2 inch square channel steel tubing. In another embodiment, second telescopic member 18 may be composed of a solid material.

Preferably, the dimensions of the inner surfaces of the first telescopic member 16 may be slightly larger than the dimensions of the outer surfaces of the second telescopic member 18, thereby allowing the second telescopic member 18 to slide into first telescopic member 16. Second telescopic member 18 may be held in position relative to first telescopic member 18 with a pin 24. Pin 24 may be positioned in a hole 26 in first telescopic member 16 and a hole 28 in second telescopic member 18. Pin 24 may be held in position with a cotter pin, a nut or other device to prevent pin 24 from inadvertently being removed from holes 26 and 28. In one embodiment, second telescopic member 18 may contain a plurality of holes 28 for receiving pin 24. Holes 28 may be spaced 6 inches apart, or at any other desired interval or location to allow the height of end 22 to be adjusted.

Figure 3:
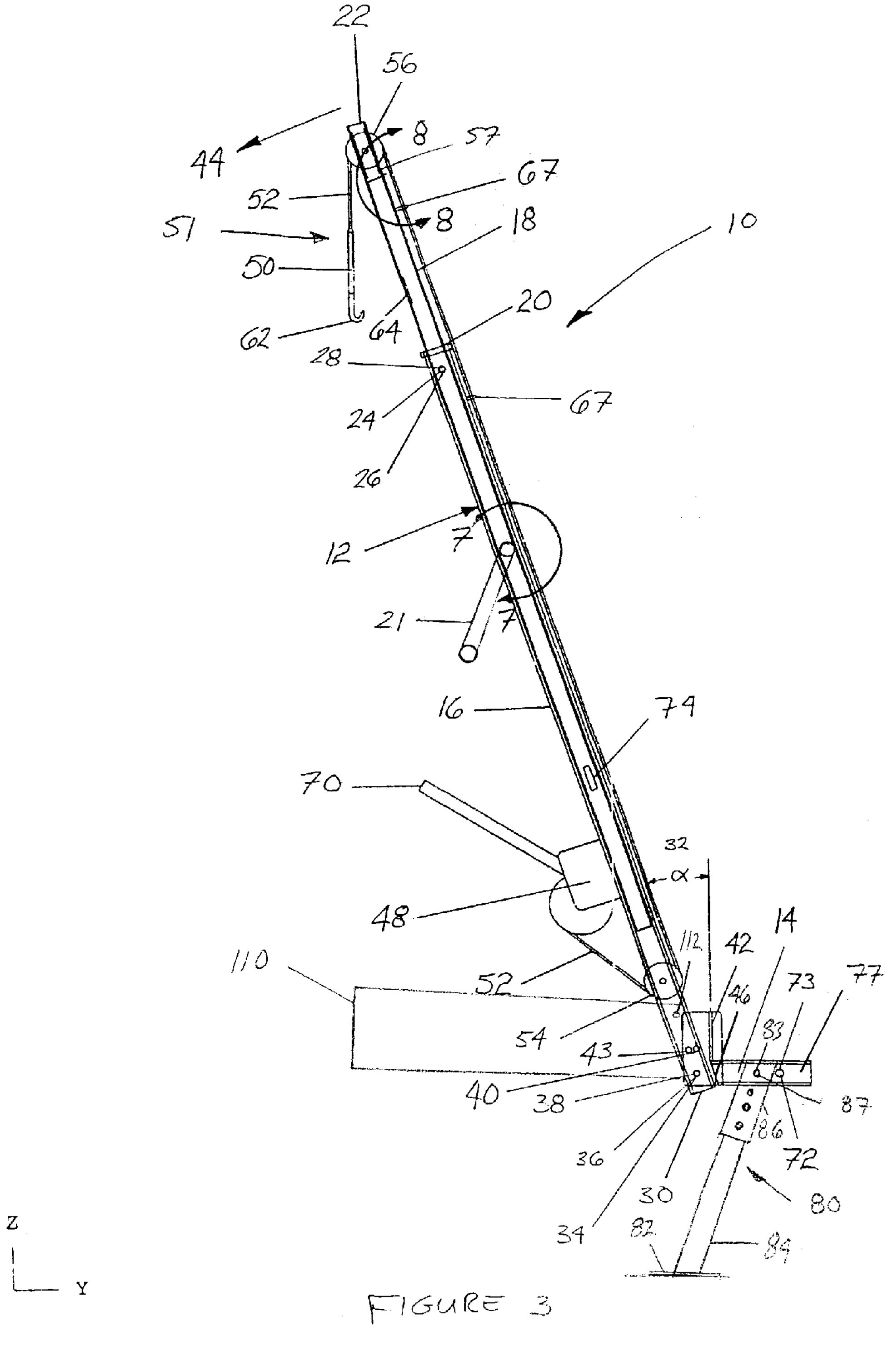
FIG. 3 is a right side view of an alternative embodiment of an animal hoist.

Second telescopic member 18 may be moved relative to the first telescopic member 16 by hand. Alternatively, as shown in FIGS. 3 and 7, the second telescopic member 18 may be moved using a crank handle 21. Crank handle 21 may be coupled to a gear 23, as shown in FIG. 7. Gear 23 may be positioned in inner aspects 25 of the first telescopic member 16. Gear 23 may mesh with a plurality of teeth 27 on an outside surface of the second telescopic member 18. The second telescopic member 18 may be extended from or retracted into the first telescopic member 16 by rotating the crank handle 21 in a first direction or in a second direction that is opposite to the first direction, respectively. As the crank handle 21 is rotated, the gear 23 meshes with the plurality of teeth 27 and advances the second telescopic member 18.

The angular position of main body 12 with respect to base 14, defined by angle α 32, may be varied depending on the task. Specifically, main body 12 may be coupled to base 14 with a pin 34, which may be inserted through a hole 36 located in base 14 and a hole 38 located in first telescopic member 16. Alternatively, pin 34 may be a bolt, a shaft, a rod, a combination of bolts, or other devices suitable to rotatably couple main body 12 to base 14. Main body 12 may be held in a generally vertical position with a pin 40. This generally vertical position may also be generally perpendicular to base 14 where angle α 32 may be about zero degrees. This generally vertical position may be used to transport a harvested animal when he animal hoist 10 is coupled to a vehicle. A support brace 42 forming a portion of base 14 serves as a stop for main body 12 to position main body 12 so that α 32 is about zero degrees. Support brace 42 thus provides a stop mechanism to prevent main body 12 from striking, and possibly damaging, the vehicle carrying animal hoist 10.

In one embodiment, pin 40 may be removed to allow main body 12 to pivot around pin 34 in a downward direction as indicated by arrow 44. Main body 12 may be pivoted so that angle α 32 equals about 18 degrees. However, in another embodiment, angle α 32 may vary be between about 5 degrees and 60 degrees. A hole 43 in base 14 receives pin 40 and secures main body 12 in an angled position. Main body 12 is supported in an angular position shown in FIG. 1 by pin 40 and angular support 46. Angular support 46 is positioned in base 14 to support main body 12 by contacting an outside surface of main body 12 when main body 12 is in an angled positioned, as shown in FIG. 1.

Figure 9:
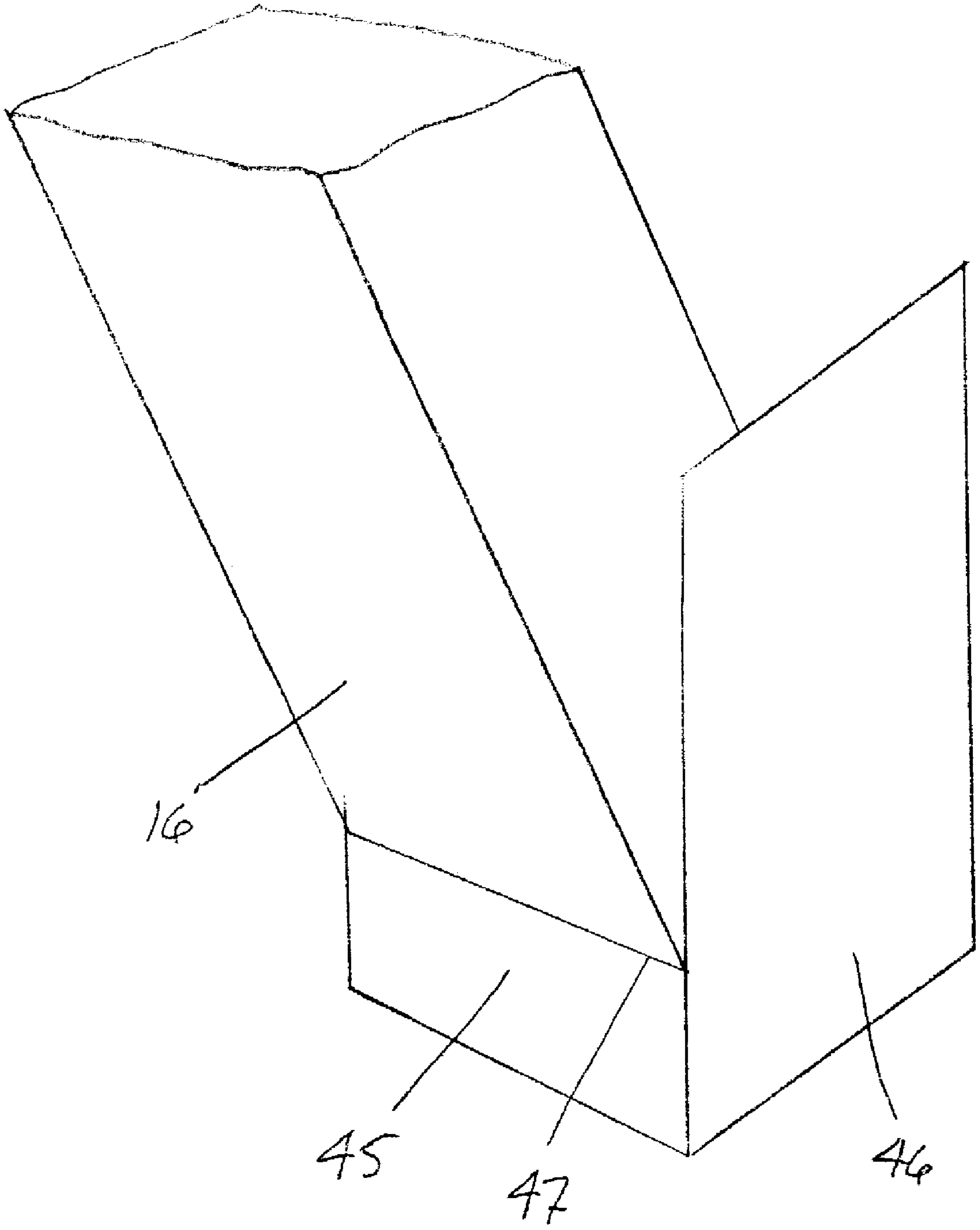
FIG. 9 is a perspective view of an angular support taken at 9—9 in FIG. 1.

In at least one embodiment, as shown in FIG. 1, angular support 46 may include a front member 45, as shown in FIG. 9, and a cavity 47 that may be configured so that as the main body 12 is lowered, the main body 12 contacts both the front member 45 and back member of angular support. Thus, angular support 46 may support the main body 12 on front and back surfaces to prevent the main body 12 from falling to the ground or from falling on someone. In an alternative embodiment, base 14 may include numerous holes 43 sized to receive pin 40 so that main body 12 can be positioned in numerous angular positions relative to base 14, such as in positions where angle α 32 is between about 5 and about 60 degrees.

Figure 2:
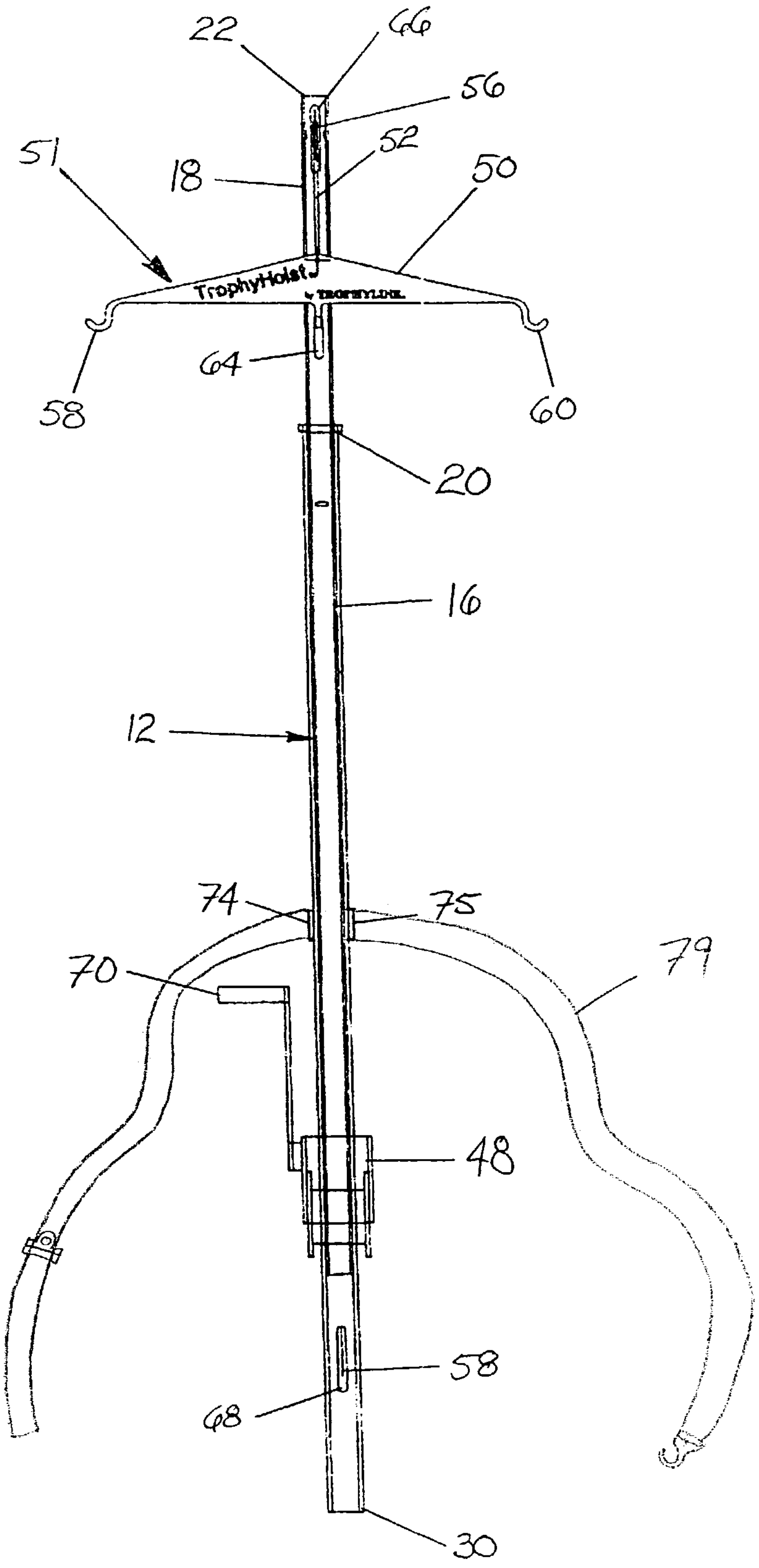
FIG. 2 is a front view of the animal hoist shown in FIG. 1.

Animal hoist 10 may include a winch 48 coupled to an attachment device 51 with a cable 52 for raising and lowering gambrel 50, as shown in FIGS. 1 and 2. Attachment device 51 may be any device capable of supporting a load. The attachment device 51 may be removeably coupled to the cable 52 using, for instance and not for purposes of limitation, a hook, quick release coupling, or other device. In at least one embodiment, the attachment device 51 may be a gambrel 50 including at least two hooks, 58 and 60, for supporting game animals. Hooks 58 and 60 are integrally formed within gambrel 50 and are positioned between about 2 feet and 3 feet apart. In one embodiment, hooks 58 and 60 may be positioned about 28 inches apart. In alternative embodiments, gambrel 50 may be formed from a single piece of material, such as steel, aluminum or other material of similar strength and have a thickness between about ¼ of an inch and about ½ of an inch. Gambrel 50 may have other dimensions. Gambrel 50 can be machined, using for instance a laser, to cut a name of a commercial entity in the surface of the gambrel 50 for marketing purposes and to reduce the weight of gambrel 50. Using the laser cutting method eliminates welds that could potentially reduce the strength of gambrel 50. In another embodiment, hooks, 58 and 60, are rotatably coupled to gambrel 50 using, for instance, pills or other similar items.

Gambrel 50 includes a retention hook 62 for securing gambrel 50 when not being used to support a harvested animal. Retention hook 62 is sized to be received in a slot 64 so that gambrel 50 may be secured to main body 12 when animal hoist 10 is not being used by tightening cable 52 with winch 48. Thus, retention hook 62 prevents gambrel 50 from swinging freely while animal hoist 10 is attached to a traveling vehicle and animal hoist 10 is not supporting a harvested animal.

Gambrel 50 is positioned on animal hoist 10 using cable 52 and pulleys 54 and 56. Pulleys 54 and 56 are rotatably coupled to main body 12 using a pin, shaft, bolt or other device allowing pulleys 54 and 56 to rotate while remaining in a stationary position relative to main body 12. In one embodiment, pulleys 54 and 56 are coupled to main body 12 within slots 66 and 68, respectively, as shown in FIG. 2, and have diameters of about 3 inches. However, pulleys 54 and 56 may be mounted to outside surfaces of main body 12 or in another configuration.

In another embodiment, animal hoist 10 may include a swivel head 57 coupled to the end 22 of the second telescopic member 18, as shown in FIGS. 3 and 8. Swivel head 57 enables pulley 56 to rotate about a longitudinal axis of the animal hoist 10 relative the second telescopic member 18. Swivel head 57, as shown in FIG. 8, may include a protrusion 59 sized to fit into a cavity 61 and allow the swivel head 57 to rotate while positioned in the cavity 61. Swivel head 57 may permit a load, such as an animal supported by the animal hoist 10, to be moved relative to the animal hoist 10 without the animal hoist 10 moving. In at least one embodiment, the swivel head 57 may permit an animal to be moved from hanging on the gambrel 50 to the back of a truck.

Figure 5:
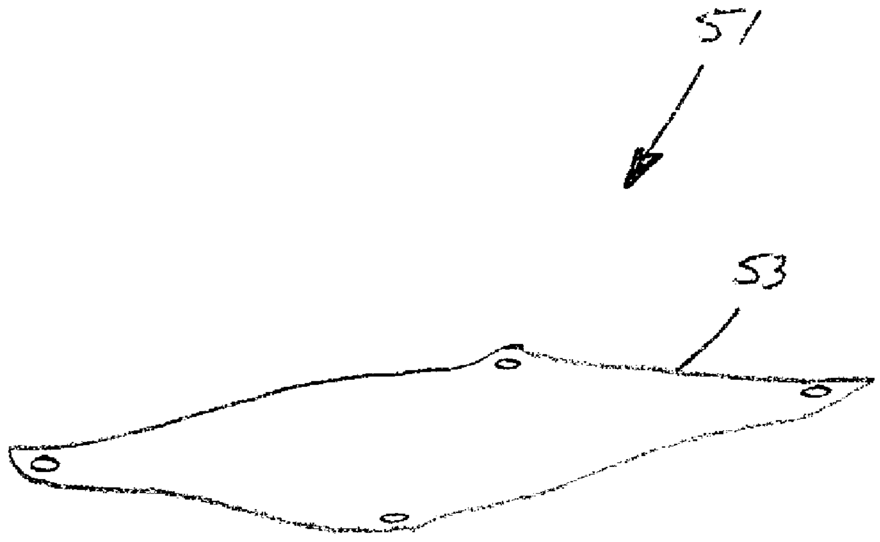
FIG. 5 is a perspective view of a utility sling.

In alternative embodiments of the animal hoist 10, gambrel 50 may be replaced with other attachment devices 51. As shown in FIG. 5, attachment device 51 may also include a utility sling 53. The utility sling 53 may include grommets at each corner for attaching the utility sling 53 to the cable 52. The utility sling 53 may be formed in various sizes and formed from various materials depending on the intended application. In at least one embodiment, the utility sling 53 may be formed from a pliable material and have sufficient strength to support the weight of logs. The utility sling 53 may be formed from CORDURA, cotton, KEVLAR, and other materials.

Figure 6:
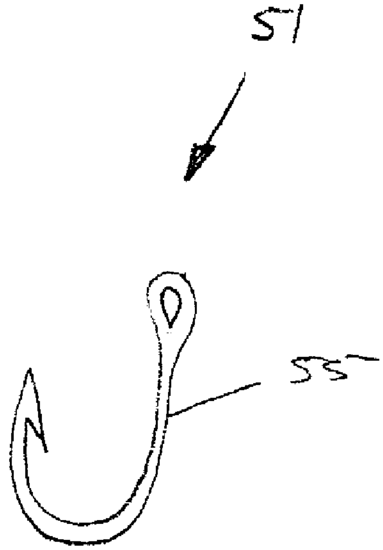
FIG. 6 is a perspective view of a hook.

In yet another embodiment, attachment device 51 may be one or more hooks 55, as shown in FIG. 6. Hook 55 may be formed from materials, such as, but not limited to, steel, such as galvanized steel, stainless steel, or other steel, aluminum, and other resilient materials. The hook 55 may be used to load or unload fish at a dock, to load fish into the boat while the boat is out at sea, or other such application.

Cable 52 couples attachment device 51 with winch 48 and may be found in many sizes. In one embodiment, cable 52 may have a diameter of about ¼ of an inch or about $^{3}/_{16}$ of an inch and may be about 25 feet in length. This enables animal hoist 10 to support a harvested animal weighing about 800 pounds. Cable 52 is positioned relative to main body 12 using cable guides 67 positioned on first telescopic member 16 and second telescopic member 18. Cable guides 67 may be welded to main body 12.

Figure 4:
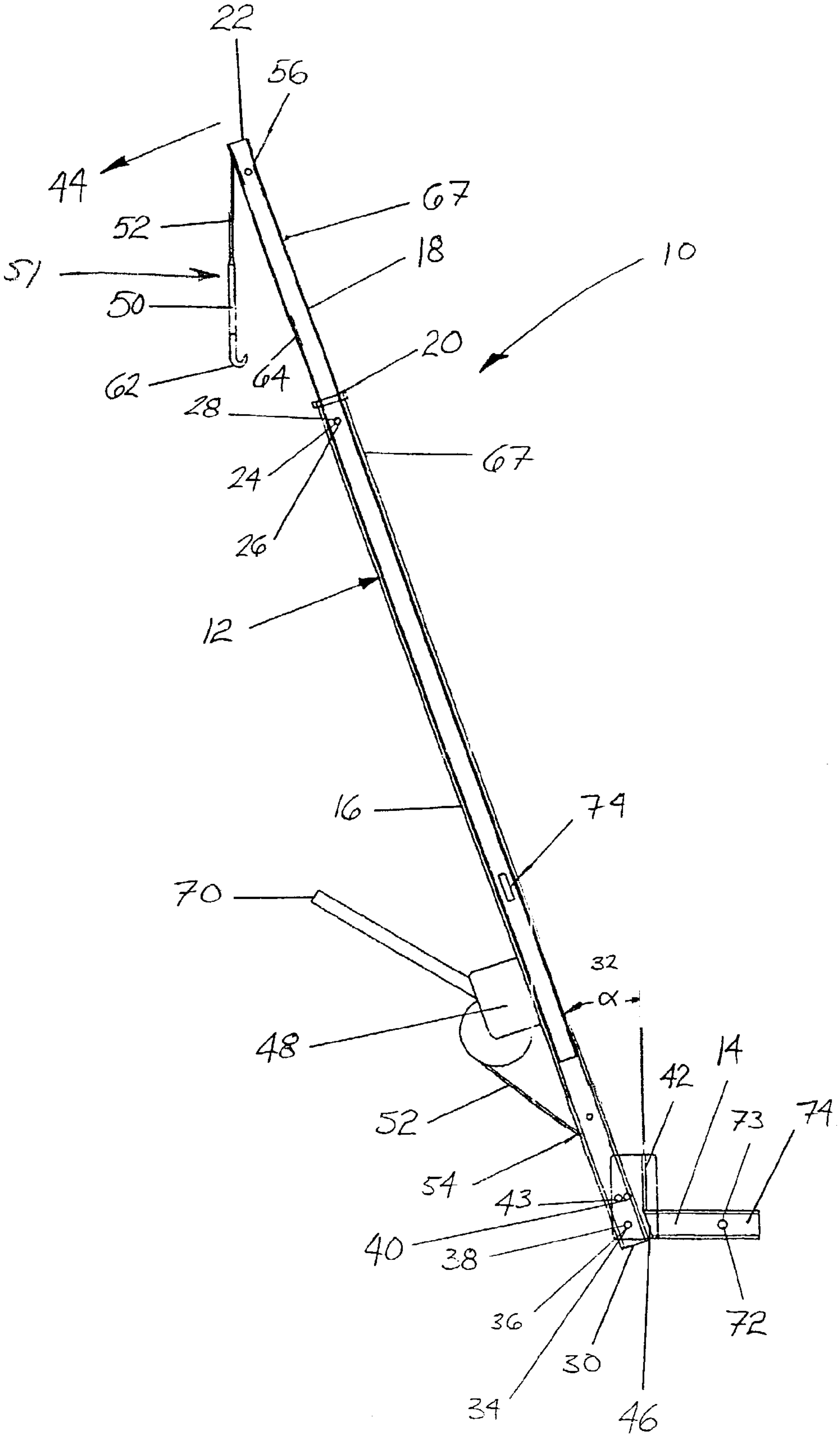
FIG. 4 is a right side view of another alternative embodiment of an animal hoist.

In an alternative embodiment, as shown in FIG. 4, pulleys 54 and 56 may be sized so that cable 52 may be run through inner aspects of the first and second telescopic members 16 and 18. Thus, the cable 52 would not be exposed. Positioning cable 52 in inner aspects of the first and second telescopic members 16 and 18 may prevent or substantially limit the development of rust on the cable 52 and may prevent injury to people contacting the cable 52 should the cable become old and warn and develop broken filaments protruding from the cable 52.

Winch 48 may be manually driven or driven with a motor using electricity, gas, compressed air or other energy source. In certain embodiments, winch 48 includes a handle 70 for manually raising or lowering gambrel 50. Winch 48 may be mounted as depicted in FIG. 1, which is positioned on a side of the animal hoist 10 facing the load to be lifted by the animal hoist 10. By positioning winch 48 in this manner, the winch 48 is not in a position that can enable the winch 48 to strike a vehicle to which the animal hoist may be attached. Thus, the animal hoist 10 having a winch 48 positioned in this manner may be positioned closer to a vehicle to which it is attached than an animal hoist 10 having a winch 48 mounted to a side of the animal hoist 10 facing away from the load to be picked up by the animal hoist 10. Alternatively, winch 48 may be mounted proximate to base 14 and on the side of main body 12 opposite from its location shown in FIG. 1. In this configuration, only a single pulley 56 may be needed.

Animal hoist 10 further includes at least one guide 74 capable of receiving a strap for securing a harvested animal. In one embodiment, animal hoist 10 includes a two guides, 74 and 75, mounted on two sides of first telescopic member 18. Guides, 74 and 75, are capable of receiving a strap 79, as shown in FIG. 2, having a width of about 1½ inches. Further, guides 74 and 75 can be attached to animal hoist 10 with welds. The strap 79 may be used to secure the body of the harvested animal for transportation. The strap 79 may also be used to secure and protect the head or antlers, if any, of a trophy animal from damage by contacting the ground or animal hoist 10 while being transported.

Animal hoist 10 may be coupled to a conventional receiver hitch (not shown) that is typically attached to the frame of vehicle near the rear bumper. However, a receiver hitch may also be coupled to the frame of a vehicle proximate to a front bumper. The vehicle may be an automobile, such as a pick-up truck or a sports utility vehicle, an all terrain vehicle (ATV), or other vehicle. The animal hoist 10 may also be coupled to a receiver hitch on a boat and positioned so that the animal hoist 10 can lift fish from the water or from a fish box, or other location. In addition, the animal hoist 10 may be capable-of lifting equipment into or out of a boat. The animal hoist may also be used by fish processing plants.

In addition to support brace 42 and angular support 46 mentioned above, base 14 may include a support member 77 that is sized to be received within a conventional receiver hitch. Support member 77 may be found in different sizes to fit different size receivers. In one embodiment, support member 77 may be composed of hollow steel tubing having a generally square cross section. In other embodiments, support member 77 may be composed of tubing having a solid or hollow cross section and having a rectangular, square, circular or other shaped cross section. Further, support member 77 may be composed of materials such as aluminum, or other materials of similar strength. Base 14 of animal hoist 10 typically includes a hole 72 for receiving a pin 73 for coupling animal hoist 10 to the receiver hitch. Pin 73 may be a conventional pin, bolt or other item capable of releasably coupling animal hoist 10 to a vehicle.

In at least one embodiment, as shown in FIG. 1, base 14 may include two or more holes 72 for coupling the animal hoist 10 to stable structure. By incorporating the two holes 72 in the base 14, the animal hoist 10 may be positioned at various distances relative to the device to which the animal hoist 10 is connected. For instance, if the animal hoist 10 is connected to a receiver hitch of a vehicle (not shown), the two holes may be used to position the animal hoist at different distances relative to the vehicle. In a first position, a pin 73 may be inserted through a hole 71 closest to pin 34. In this position, the animal hoist 10 is relatively close to the rear portions of a vehicle to which the animal hoist may be coupled. This position may be convenient for transporting the animal hoist 10. The pin 73 may also be inserted into the hole 72 further from the pin 34 to place the animal hoist in a second position relative to a vehicle. In this position, the animal hoist 10 is positioned further from the vehicle than in the first position. In the second position and in an embodiment where the animal hoist 10 is attached to a truck, a tailgate of the truck may be lowered with hitting the animal hoist 10. In one embodiment, the distance between the two holes 72 may be, but is not limited to, about 6 inches.

As shown in FIG. 3, animal hoist 10 may include one or more legs 80 for supporting the animal hoist 10. The leg 80 may be constructed of components similar to the components used to construct the first and second telescopic members 16 and 18. Alternatively, leg 80 may be constructed of other materials. Leg 80 may include a base plate 82 for contacting a ground surface. The base plate 82 may be fixedly attached to the leg 80 or may be movably or releasably attached to the leg 80. The height of leg 80 may be adjustable relative to support member 77 so that the base plate 82 may contact a ground surface regardless of the distance between the support member 77 and the ground surface. The leg 80 may be releasably attached to the support member 77. The distance between the base plate 82 and the support member 77 may be adjustable by coupling the leg 80 to the support member in one of a plurality of holes 83 in the leg 80 using pin 87. In at least one embodiment, leg 80 may be formed from a lower member 84 and an upper member 86. The upper member 86 may be sized to allow the lower member 84 to slide into the upper member 86 so that the base plate may be kept in contact with a ground surface while the animal hoist 10 is supporting a load. This configuration also enables the leg 80 to be removed so that, if the animal hoist 10 is attached to a vehicle, the vehicle may be moved without damaging the leg 80.

As shown in FIG. 3, the animal hoist 10 may also include a basket 110. Basket 110 may be coupled to the main body 12 for supporting animals and other items. Basket 110 may be releasably coupled to the main body 12 using one or more pins 112. In at least one embodiment, basket 110 may be about the width of a vehicle, which may be between about 4 and about 5.5 feet, may extend about 3 feet from base 14, and may have a depth between about 2 inches and about 18 inches. Alternatively, the basket 110 may have other dimensions. In at least one embodiment, basket 110 may be centered on the main body 12 so that half extends to one side of the main body 12 and the other half extends to the other side. The basket 110 may be constructed of metals, such as steel, aluminum or other metals, or other resilient materials.

During use, animal hoist 10 may be coupled to a vehicle and left in place throughout a hunt. For instance, animal hoist 10 can be attached to a vehicle while a hunter travels to a hunting area, while an animal is harvested, while a harvested animal is field dressed and removed from the field, and while the hunter returns home without having to ever remove animal hoist 10 from the vehicle. Once back at home, the hunter can easily remove the animal hoist 10 from the vehicle because in one embodiment, the animal hoist 10 weighs only about 60 pounds.

Once a hunter has harvested an animal and animal hoist 10 is safely coupled to a vehicle, the vehicle is driven as close as possible to a harvested animal. If an ATV is the vehicle, the ATV may be driven to the location where the animal fell. Once the harvested animal is within about 15 feet of winch 48, winch 48 is released from a locked position to enable retention hook 62 of gambrel 50 to be removed from slot 64. If the harvested animal is large, second telescopic member 18 may be extended by first removing pin 24 from holes 26 and 28 and positioning the member 18 at an appropriate height. Crank handle 21 may be rotated to extend or retract the second telescopic member 18. Second telescopic member 18 may be held in this position by inserting pin 24 into holes 26 and 28 located on second telescopic member 18. Once main body 12 has been correctly positioned, hooks 58 and 60 may be attached to the rear legs of the harvested animal by inserting hooks 58 and 60 into slits cut by the hunter in the harvested animal's legs proximate to its feet and generally parallel to the a longitudinal axis of its leg. Winch 48 may be then actuated to raise the harvested animal from the ground. Preferably, the harvested animal is raised so that no portion of the animal is positioned below the bumper of the transportation vehicle.

The harvested animal may be field dressed before transportation if desired. If the harvested animal is to be field dressed, pin 34 is removed and main body 32 is allowed to rotate downward in the direction of arrow 44. Preferably, the angular position of main body 12 is adjusted before the harvested animal is suspended from the ground. If the harvested animal has already been suspended from the ground, the harvested animal may be returned back to the ground to allow the angular relationship of main body 12 to be changed relative to base 14. In certain embodiments, main body 12 rotates until contacting angular support 46 of base 14. Pin 36 is then placed back into base 14; to secure main body 12. In this position, the harvested animal often does not contact main body 12.

After the harvested animal has been field dressed, main body 12 may be returned to its beginning position, where angle $\alpha$ 32 is about zero. The harvested animal may be strapped to animal hoist 10. If the harvested animal is exceptionally large, additional straps may be used to secure the animal's head to prevent it from contacting the ground or hitting the animal hoist 10 during transportation. If the harvested animal was not field dressed in the field, the harvested animal may be field dressed at a hunting camp, or in any other location, such as next to a stream, using animal hoist 10. For instance, after a harvested animal has been coupled to animal hoist 10 and raised from the ground, the harvested animal can be transported to a creek, lake or other water supply so that the internal cavity of the animal may be rinsed.

As described above, animal hoist 10 may be coupled to a base station, not shown, at a hunting camp or in any other location. The base station is preferably portable and may be constructed out of lumber, concrete or other suitable materials. The base station may be composed of a conventional receiver hitch capable of receiving base 14 of animal hoist 10. The base station should be sufficiently weighted to counteract the weight of a harvested animal intended to raised using the animal hoist. Preferably, the base station is easily transported by having the capability of being taken apart or sized to fit within a vehicle.

If the animal hoist is used with an ATV, leg 80 may be coupled to animal hoist 10 to give animal hoist 10 additional support. In one embodiment, the leg 80 may be coupled to the animal body proximate to base 14 and should be capable of contacting the ground to support the weight of a harvested animal. The leg 80 may be extendible. During use, the support arms are placed in contact with the ground. The harvested animal is then raised from the ground using animal hoist 10. The harvested animal is strapped to animal hoist 10, and the support arms are removed and secured for transport. The ATV is then able to transport the harvested animal.

The foregoing is provided for purposes of illustrating, explaining, and describing embodiments of this invention. Modifications and adaptations to these embodiments will be apparent to those, skilled in the art and may be made without departing from the scope or spirit of this invention or the following claims.

We claim:

1. A hoist, comprising:

at least one first telescopic member;

at least one second telescopic member extending from inside the at least one first telescopic member and releasably secured in a first position relative to the at least one first telescopic member;

at least one base rotatably coupled to an end of the at least one first telescopic member opposite to an end from which the at least one telescopic member extends to rotate about an axis orthogonal to the at least one first telescopic member and generally horizontal when used, wherein the at least one base is adapted to be received in a releasably receiver, at least one support brace coupled to the at least one base for limiting the rotation of the at least one first telescopic member about the axis;

at least one winch coupled to the at least one first telescopic member;

at least one cable coupled to the at least one winch and coupled to at least one attachment device;

at least one attachment device coupled to the at least one cable; and at least one crank and at least one gear for moving the second telescopic member relative to the first telescopic member.

2. The hoist of claim 1, wherein the at least one winch is coupled to the at least one first telescopic member on a side of the at least one first telescopic member opposite to the base.

3. The hoist of claim 1, wherein the base further comprises at least two orifices for receiving a pin to couple the base to a receiver.

4. The hoist of claim 1, futher comprising at least one leg coupled to the base and extending in a direction generally opposite to a direction in which the first telescopic member extends from the base.

5. The hoist of claim 4, wherein the at least one leg comprises at least two legs.

6. The hoist of claim 4, wherein the at least one leg comprises an upper member and a lower member, where the lower member is movable relative to the upper member.

7. The hoist of claim 1, further comprising a basket coupled to the hoist proximate to the base.

8. The hoist of claim 1, further comprising a swivel head coupled to an end of the second telescopic member opposite to an end of the second telescopic member contained in the first telescopic member.

9. The hoist of claim 1, wherein the attachment device is selected from the group consisting of a utility sling, a hook, and a gambrel having at least two hooks for supporting a load.

10. The hoist of claim 1, wherein the attachment device is a gambrel having at least one retention hook for releasably attaching the gambrel to the first telescopic member.

11. The hoist of claim 1, wherein the first telescopic member comprises at least one slot for receiving the at least one retention hook.

12. The hoist of claim 1, further comprising an angular support coupled to the base for limiting the rotational movement of the first telescopic member relative to the base and permits movement only about a generally horizontal axis.

13. The hoist of claim 12, further comprising a pin for positioning the first telescopic member in a fixed position relative to the at least one base and the angular support and further comprising a plurality of holes for positioning the first telescopic member in at least one of a plurality of positions.

14. The hoist of claim 1, wherein the first telescopic member may rotate between a substantially vertical position and about 60 degrees from the substantially vertical position.

15. The hoist of claim 14, wherein the first telescopic member may be positioned at about 18 degrees.

16. The hoist of claim 1, wherein the at least one cable extends from the at least one winch to the at least one attachment device through inner aspects of the first and second telescopic members.

17. The hoist of claim 1, further comprising at least one pulley rotatably coupled to the first telescopic member proximate to the at least one winch and at least one pulley rotatably coupled to the second telescopic member at an end apposite to the end contained in the second telescopic member.

18. The hoist of claim 17, wherein the at least one pulley coupled to the first telescopic member is positioned in a slot in the first telescopic member and the at least one pulley coupled to the second telescopic member is positioned in a slot in the second telescopic member.

19. A hoist, comprising:

at least one first telescopic member;

at least one second telescopic member extending from inside the at least one first telescopic member and releasably secured in a first position relative to the at least one first telescopic member;

at least one base rotatably coupled to an end of the at least one first telescopic member opposite to an end from which the at least one telescopic member extends to rotate about an axis orthogonal to the at least one first telescopic member and generally horizontal when used, wherein the at least one base is adapted to be received in a releasably receiver;

at least one support brace coupled to the at least one base for limiting the rotation of the at least one first telescopic member about the axis;

at least one winch coupled to the at least one first telescopic member, at least one cable coupled to the at least one winch and coupled to at least one attachment device;

at least one attachment device coupled to the at least one cable;

an angular support coupled to the base for limiting the rotational movement of the first telescopic member relative to the base and permits movement only about a generally horizontal axis; and a swivel head coupled to an end of the second telescopic member opposite to an end of the second telescopic member contained in the first telescopic member; and at least one crank and at least one gear for moving the second telescopic member relative to the first telescopic member.

20. The hoist of claim 19, wherein the at least one winch is coupled to the at least one first telescopic member on a side of the at least one first telescopic member opposite to the base.

21. The hoist of claim 19, further comprising at least two legs formed from an upper member and a lower member movable relative to each other, coupled to the base, and extending in directions generally opposite to a direction in which the first telescopic member extends from the base.

22. The hoist of claim 19, further comprising a basket coupled to the hoist proximate to the base.

23. The hoist of claim 19, wherein the attachment device is selected from the group consisting of a utility sling, a hook, and a gambrel.

24. The hoist of claim 19, wherein the attachment device is a gambrel having at least one retention hook for releasably attaching the gambrel to the first telescopic member and the first telescopic member comprises at least one slot for receiving the at least one retention hook.

25. The hoist of claim 19, further comprising a pin for positioning the first telescopic member in a fixed position relative to the at least one base and the angular support and further comprising a plurality of holes for positioning the first telescopic member in at least one of a plurality of positions.

26. The hoist of claim 19, wherein the first telescopic member may rotate between a substantially vertical position and about 60 degrees from the substantially vertical position.

27. The hoist of claim 26, wherein the first telescopic member may be positioned at about 18 degrees.

28. The hoist of claim 19, wherein the at least one cable extends from the at least one winch to the at least one attachment device through inner aspects of the first and second telescopic members.

29. The hoist of claim 19, further comprising at least one pulley rotatably coupled to the first telescopic member proximate to the at least one winch and at least one pulley rotatably coupled to the second telescopic member at an end opposite to the end contained in the second telescopic member.

30. The hoist of claim 29, wherein the at least one pulley coupled to the first telescopic member is positioned in a slot in the first telescopic member and the at least one pulley coupled to the second telescopic member is positioned in a slot in the second telescopic member.

* * * * *

UNITED STATES PATENT AND TRADEMARK OFFICE

CERTIFICATE OF CORRECTION

| | | |
|---|---|---|
| PATENT NO. | : 7,059,955 B2 | Page 1 of 1 |
| APPLICATION NO. | : 10/424029 | |
| DATED | : June 13, 2006 | |
| INVENTOR(S) | : Green et al. | |

It is certified that error appears in the above-identified patent and that said Letters Patent is hereby corrected as shown below:

Claim 1, column 11, line 32, replace “releasably” with --releasable--.
Claim 17, column 12, line 37, replace “apposite” with --opposite--.
Claim 19, column 12, line 56, replace “releasably” with --releasable--.

Signed and Sealed this

Fifteenth Day of August, 2006

JON W. DUDAS
*Director of the United States Patent and Trademark Office*